United States Patent

[11] 3,568,062

[72] Inventor Stephen J. Brolin
Bronx, N.Y.

[21] Appl. No. 724,853
[22] Filed Apr. 29, 1968
[45] Patented Mar. 2, 1971

[73] Assignee Bell Telephone Laboratories, Incorporated
Murray Hill, Berkeley Heights, N.J.

[54] DISCRETE COMPANDOR UTILIZING HYSTERESIS
4 Claims, 3 Drawing Figs.

[52] U.S. Cl. .......... 325/38, 325/321, 325/322, 325/325
[51] Int. Cl. .......... H04b 1/00, H04b 7/00
[50] Field of Search .......... 178/88; 324/68 (A); 325/67, 321, 322, 325, 363, 38.1, 38 (A), 38, 39, 41, 42, 44; 179/15 (AEC), 15 (APC), 15 (ACE)

[56] References Cited

UNITED STATES PATENTS

| | | | |
|---|---|---|---|
| 3,180,939 | 4/1965 | Hall | 179/15APC |
| 3,354,267 | 11/1967 | Crater | 325/38.1 |
| 3,382,438 | 5/1968 | Geller | 325/38 |

*Primary Examiner*—Robert L. Griffin
*Assistant Examiner*—Albert J. Mayer
*Attorneys*—R. J. Guenther and E. W. Adams, Jr.

ABSTRACT: In a delta modulation transmission system employing discrete companding utilizing a discretely variable step size, a hysteresis circuit is added to minimize step size transitions by altering the traversed predetermined level in the pulse code modulation encoder which determines the discrete step size used for the delta modulator.

INVENTOR
S. J. BROLIN
BY R B [signature]
ATTORNEY

DISCRETE COMPANDOR UTILIZING HYSTERESIS

BACKGROUND OF THE INVENTION

This invention relates generally to a digital transmission system and, more particularly, to a digital transmission system employing discrete companding. In a prior application of mine, Ser. No. 674,943, filed Oct. 12, 1967, now U.S. Pat. No. 3,500,441 a digital transmission system is shown with discrete companding. At the modulator, a discretely variable size step pulse which is adapted to a parameter of the message signal to be transmitted to the modulator is used to compress the message signal in the modulator. At the demodulator, complementary expansion utilizing a discrete variable size step pulse causes the original signal message transmitted to be recreated. In both the modulator and demodulator, the variable size step pulse may assume one of several discrete logarithmically related sizes.

The step size selected is determined by a parameter of the message signal to be transmitted to the demodulator. If the parameter of the message signal exceeds a first predetermined level and is below a second higher predetermined level, a pulse having a first magnitude will be generated; while, if the parameter exceeds the second but is below a third still higher predetermined level, a pulse having another magnitude will be generated. In my prior application, four discrete step sizes were used but any number of discrete step sizes may be used to provide compression at the modulator and complementary expansion at the demodulator.

The analogue message signal is sampled at the transmitter and is applied to a comparison circuit which selects the step size to be used to provide compression. When the sampled message signal has its magnitude approximately equal to one of the predetermined levels, undesirable and unnecessary step size transitions may occur. This may be caused by noise or varying volume in the message signal and imperfections in the electronic apparatus which senses the magnitude of the message signal. For instance, if the sensed analogue signal is slightly above one of the predetermined levels, noise and imperfections may cause the analogue signal, as measured, to vary above and below the predetermined level. This will cause undesired and unnecessary pulse magnitude transitions to be produced at both the modulator and demodulator.

In addition to the undesired transitions being caused by noise and component imperfections, the message signal itself may cause this unwanted phenomenon. For example, where consecutive sampled magnitudes vary slightly, it would be undesirable for this slight variation to cause a step size transition because each step size transition causes the modulator and demodulator to switch operational states. For instance, the signal-to-noise ratio varies approximately inversely with the step size. Thus, where the step size varies for a relatively constant analogue signal, it would seem as if a noise generator was being switched in and out of the transmission path. When the magnitude of the analogue signal changes significantly though, the step pulse produced should be varied to track the significant change.

One method of eliminating this transition problem is to heavily filter the analogue signal before applying it to the step size encoder. The response time of the filtering network required to eliminate the transition problem is generally unsuitable for use where the modulator must track the varying analogue signal applied to its input.

While this transition problem may be found in the system disclosed in my prior application, this same problem may be found in one more general type of analogue-to-digital converter. In particular, where an analogue-to-digital converter comprises a plurality of comparator circuits which are used to determine the magnitude of the pulse (quantum step) produced by the converter, the same transition problem described with reference to discrete companding would be found. The converter will produce a pulse having a first magnitude if the analogue signal exceeds a first predetermined level and is below a second higher predetermined level, while if the analogue signal exceeds the second but is below a third still higher predetermined level, a pulse having another magnitude will be generated. When the measured analogue signal is approximately at one of the predetermined levels, the transition problem previously described will be present.

An object of the present invention is to minimize undesirable pulse magnitude transitions in a delta modulator used in digital transmission systems employing discrete companding.

Another object of the present invention is to minimize pulse magnitude transitions in a digital transmission system employing discrete companding without significantly affecting the response time of the digital transmission system.

A further object of the present invention is to minimize undesirable pulse magnitude transitions in one type of analogue-to-digital converter.

SUMMARY OF THE INVENTION

In accordance with the present invention, the above objects are accomplished in an encoder of a delta modulator by varying the exceeded predetermined level in the encoder, which causes a pulse having a corresponding predetermined magnitude to be generated after the predetermined level is exceeded. Succeeding pulse magnitudes produced will be dependent upon the previously selected pulse magnitude because of the predetermined level variations. In the modulator and demodulator of a digital transmission system employing the type of discrete companding disclosed in my prior application, when a first predetermined level is exceeded while a second higher level is not, the predetermined levels are lowered after the first predetermined level is traversed. By lowering the predetermined levels, the next analogue sample whose magnitude will determine the pulse magnitude produced by the encoder to accomplish discrete companding will fall in the same range as the previous analogue sample with greater probability than if the levels were not lowered. By lowering the predetermined levels, it is less likely that noise and circuit imperfections will cause a pulse magnitude transition.

In accordance with another aspect of the present invention, in the general type of analogue-to-digital converter described above, the predetermined levels which control the pulse magnitude produced by the converter will be varied in accordance with the pulse magnitude selected. By lowering the predetermined levels, the analogue-to-digital converter will be less sensitive to noise and circuit imperfections.

DETAILED DESCRIPTION

Figures 1, 3:
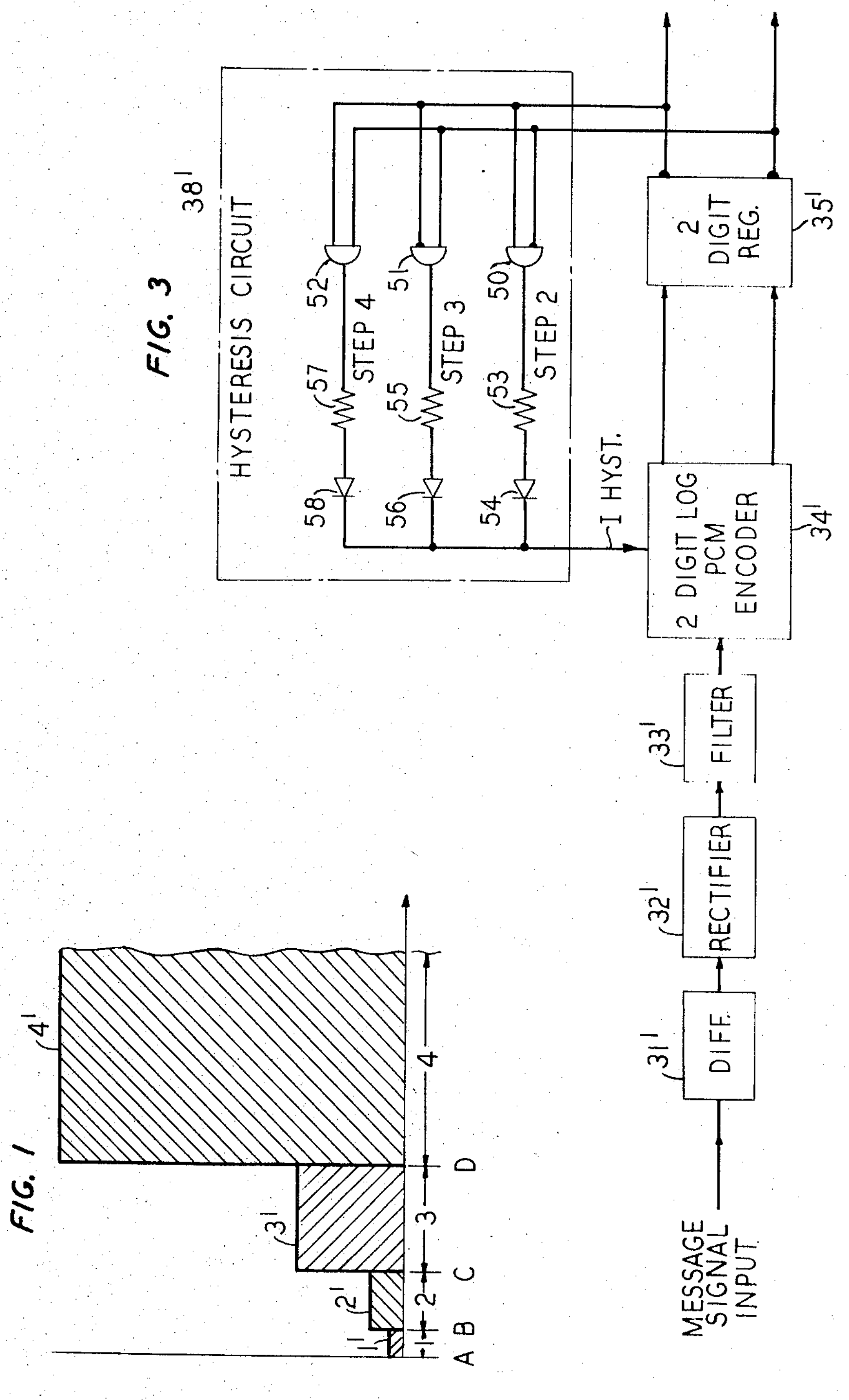
FIG. 1 is a representation of the logarithmically related pulse magnitudes produced in a digital transmission system employing the type of discrete companding shown in my prior application.
FIG. 3 is a more detailed diagram of the present invention which alters the traversed predetermined level in accordance with the previous pulse magnitude selected to provide compression at the modulator and complementary expansion at the demodulator.

FIG. 1 is a representation of the pulse magnitude produced in the modulator to achieve compression and the demodulator to achieve complementary expansion in a digital transmission system employing the type of discrete companding shown in my prior application. When the magnitude of the sensed analogue signal is above level A (where A generally IS o VOLTS) and below level B in region 1, a pulse having magnitude 1′ is produced. When the magnitude of the sensed analogue signal is above level B and below level C and falls in region 2, a pulse having magnitude 2′ will be generated. Similarly, pulse magnitudes 3′ and 4′ will be generated corresponding to sensed analogue magnitudes falling in regions 3 and 4, respectively.

When the magnitude of the sensed analogue signal is approximately at one of the predetermined critical levels A, B, C, or D, undesirable transitions from one discrete step size to another may occur. These are due to imperfections in the apparatus and noise in the analogue signal and slightly varying volume. As is clear in FIG. 1, there is a great magnitude difference between the discrete step pulses. When the magnitude of the sampled analogue signal varies insignificantly between samples, it would also be undesirable for a step size transition to occur because of the problems enumerated above. These problems may be eliminated in accordance with the present invention.

If the magnitude of the sampled analogue signal is, for example, slightly above level C, a pulse having magnitude 3' will be generated for use in the modulator and demodulator in order to achieve compression at the modulator and expansion at the demodulator. When this pulse is generated in accordance with the present invention, level C is lowered and unless a significant change in the magnitude of the sensed analogue signal occurs, the next selected pulse will have magnitude 3'. By lowering level C, the selected step size will be relatively impervious to noise in the analogue signal and imperfections in the electronic apparatus and undesirable step size transitions will be eliminated. As the invention has been described, its effect may be called "hysteresis" since the next selected step size is determined, in part, by the history of the previously selected steps in a way which discourages transitions.

Figure 2:
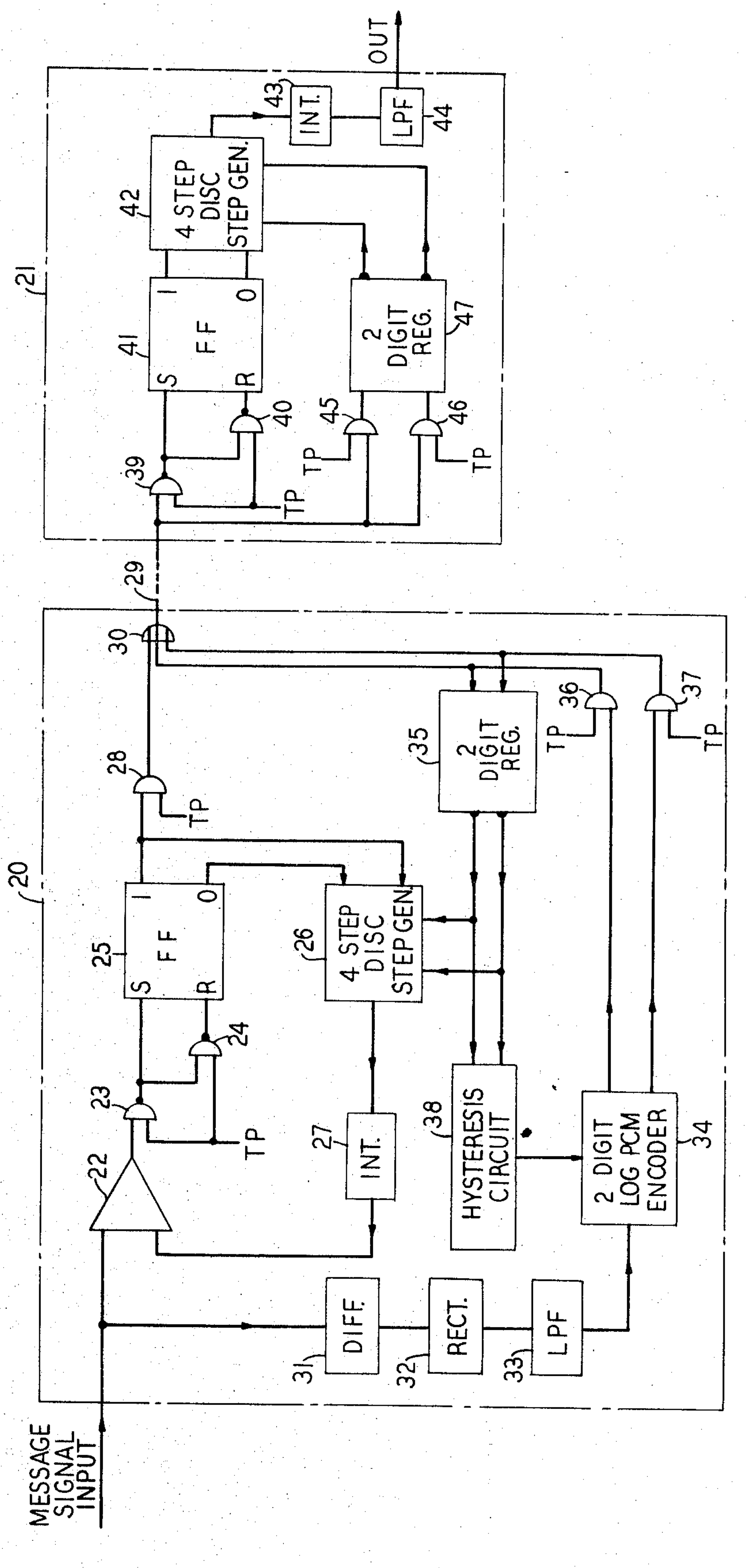
FIG. 2 is a block diagram of a digital transmission system employing the type of companding shown in my prior application and including an embodiment of the present invention.

FIG. 2 is a block diagram of a delta modulation transmission system employing the type of discrete companding shown in my prior application and including the hysteresis circuit which is one embodiment of the present invention. Transmitter 20 digitally encodes the analogue signal applied to it and its output is applied as an input to receiver 21 which decodes the digitally transmitted message and recreates the original analogue signal. The analogue message signal is applied to comparator 22 which is a two-input circuit delivering an output having the polarity of the difference between its inputs.

The output of comparator 22 is connected to a sample-and-hold circuit made up of a pair of inverting AND gates 23 and 24 and a bistable multivibrator or flip-flop 25. The inverting property of AND gates 23 and 24 is indicated symbolically by the small circles at their respective outputs. As illustrated in FIG. 2, the output of comparator 22 is connected to one input of AND gate 23 and the output of AND gate 23 is connected to one input of AND gate 24. Timing pulses are applied to the other inputs of AND gates 23 and 24. The output of AND gate 23 is connected to the set input S OF flip-flop 25, while the output of AND gate 24 is connected to the reset input R.

When the output of comparator 22 is positive while a timing pulse is present, AND gate 23 applies a negative voltage to the set input of flip-flop 25 and AND gate 24 applies a positive voltage to the reset input. Under such conditions the output state of flip-flop 25 is as illustrated, with binary 1 appearing at the upper or set output and binary 0 appearing at the lower or reset output. When the output of comparator 22 is negative during a timing pulse, AND gate 23 applies a positive voltage to the set input of flip-flop 25 and AND gate 24 applies a negative voltage to the reset input. Under such conditions the output state of flip-flop 25 is opposite to that illustrated, with binary 0 appearing at the upper or set output and binary 1 appearing at the lower or reset output. By way of example, in both states of flip-flop 25, binary 1 is represented by a positive voltage and binary 0 by a zero voltage.

The outputs of flip-flop 25 are connected to respective inputs of a 4-step discrete step signal generator 26 which generates a positive-going step signal when flip-flop 25 is in the state illustrated, and a negative-going step signal when flip-flop 25 is in the opposite state. The output of step signal generator 26 is connected to an integrating circuit 27, and the output of integrator 27 is connected to the remaining input of comparator 22. Integrator 27 may include one or more stages of integration, as desired.

Output digits are taken from the upper or set output of flip-flop 25 and applied to one input of AND gate 28, the other input of which is supplied with timing pulses delayed slightly from those applied to AND gates 23 and 24. The output from AND gate 28 is supplied to the outgoing line 29 through OR gate 30. The sample-and-hold circuit samples the output of comparator 22 at a rate sufficiently high to permit the audio message waveform to be reproduced with acceptable accuracy. If the output of comparator 22 is positive, indicating that the instantaneous amplitude of the message waveform is larger than the output of integrator 27, a positive step signal is provided by generator 26 and binary 1 is transmitted through AND gate 28 and OR gate 30. If the output of comparator 22 is negative, indicating that the instantaneous amplitude of the message waveform is smaller than the output of integrator 27, the step signal produced by generator 26 is negative and binary 0 is transmitted through AND gate 28 and OR gate 30.

As set forth in my prior application, the dynamic range of the delta modulator itself is enhanced by adapting the size of the positive-going and negative-going step signals produced by generator 26 to the volume level and frequency content of the message waveform on a discrete basis. Since a delta modulator overloads on slope, a level sensor made up of differentiator 31, rectifier 32 and low-pass filter 33 in tandem is connected from the input of transmitter 20 to the input of a 2-digit pulse code modulator encoder 34. Encoder 34 is a pulse code modulation encoder of a type well known in the art, producing a 2-digit parallel binary code output on its two output leads.

As a 2-digit encoder, encoder 34 encodes up to four different levels. These are preferably logarithmically related to one another, 12 decibels apart. The most significant digit of the binary code output of pulse code modulation encoder 34 appears on the upper of the two output leads, and the least significant digit appears on the lower.

The upper lead of the output of encoder 34 is supplied to one input of two-input AND gate 36, while the lower lead of the output of encoder 34 is supplied to one input of two-input AND gate 37. The second inputs of AND gates 36 and 37 are supplied with appropriate timing pulses. The outputs of AND gates 36 and 37 form the inputs for OR gate 30, the output of which is transmitted to receiver 21 by way of transmission line 29. The outputs of AND gates 36 and 37 are also supplied to two-digit register 35. Two-digit register 35, as indicated by the small circles, has its outputs inverted. Each stored binary 0 is thus delivered as binary 1 and vice versa. The output of two-digit register 35 is supplied to step generator 26 to determine the step size to be applied to integrator 27.

In accordance with one aspect of the present invention, a hysteresis circuit 38 is interposed between the output of two-digit register 35 and encoder 34. Encoder 34, as is well known in the art, derives its output from the analogue signal applied to its input. If the input is above a first predetermined level but below a second higher predetermined level, a corresponding digit code is produced, while if the input signal is above the second and below a third still higher predetermined level, another digital code is produced. As described above with reference to FIG. 1, undesirable step size transitions may occur when the analogue input to encoder 34 is approximately at one of the predetermined levels. Hysteresis circuit 38 is used to vary the predetermined levels in encoder 34. This is accomplished in hysteresis circuit 38 by its production of an output hysteresis current supplied to encoder 34, which is dependent upon the digital code stored in register 35. The current supplied from hysteresis circuit 38 to encoder 34 lowers the predetermined levels by changing the biasing current in encoder 34. In this manner, undesirable step size transitions are minimized.

Complementary expansion is provided at receiver 21. The digital information transmitted in line 29 is applied to a sample-and-hold circuit comprising a pair of inverting AND gates 39 and 40 and a flip-flop 41. Receiver 21, in essence, is a delta demodulator serving not only to decode the received message digits and convert them back to the original message waveform, but also to provide discrete syllabic expansion which is complementary to the compression performed at transmitter 20 in the associated delta modulator. Transmission line 29 is connected to one input of AND gate 39 and the output of AND gate 39 is connected to one input of AND gate 40. The remaining inputs of AND gates 39 and 40 are supplied with specified timing pulses. The output of AND gate 39 is also connected to the set input S OF flip-flop 41 and the output of AND gate 40 is connected to the reset input R.

The set and reset outputs of flip-flop 41 are connected to respective inputs of a four-step discrete step generator 42 which is substantially identical to the step signal generator 26 located at transmitter 20. Step signal generator 42 produces a positive-going step signal when flip-flop 41 is in the state illustrated and a negative-going signal when flip-flop 41 is in the opposite state. The output of step signal generator 42 is connected through an integrator 43 to a low-pass filter 44 to recreate the originally encoded message waveform. Integrator 43 is substantially identical to integrator 27 located in transmitter 20 and, like it, may include one or more stages of integration as desired.

In turn, the incoming binary message digits carried by transmission line 29 cause the sample-and-hold circuit, step signal generator 42 and integrator 43 to track the action of the sample-and-hold circuit, step signal generator 26 and integrator 27 in transmitter 20. A received binary 1 causes a negative voltage to appear at the output of AND gate 39 and a positive voltage to appear at the output of AND gate 40. Flip-flop 41 is switched to the state illustrated, and step signal generator 42 produces a positive-going step signal. A received binary O causes a positive voltage to appear at the output of AND gate 39. Flip-flop 41 is switched to the state opposite to that illustrated, and step signal generator 42 produces a negative-going step signal.

Receiver 21 is provided with a discrete syllabic expansion complementary to the discrete syllabic compression provided by the audio delta modulator in transmitter 20. This syllabic expansion is provided by a pair of AND gates 45 and 46 and a two-digit register 47. The digital information carried by transmission line 29 is supplied to one input of each of AND gates 45 and 46 which serve to select the incoming companding digits with the aid of timing pulses which are delayed from the timing pulses applied to AND gates 36 and 37 by the transmission delay, respectively. REgister 47 is substantially the same as register 35 in transmitter 20 and, like it, inverts the digits appearing on its two output leads. These inverted companding digits are applied as control signals to step signal generator 42, causing the latter to track the operation of step signal generator 26.

FIG. 2 has set forth a block diagram of a delta modulation transmission system which includes discrete syllabic companding and, in addition, in accordance with an embodiment of the present invention, includes a hysteresis circuit which minimizes undesirable step size transitions in generators 26 and 42.

FIG. 3 is a more detailed diagram of the hysteresis circuit which forms an embodiment of the present invention. Since FIG. 3 is a more detailed diagram than FIG. 2 but contains similar functional blocks, primed numbers are used in FIG. 3 to designate the same functional blocks shown in FIG. 2. The audio input signal is applied to differentiator 31′, rectifier 32′ and low-pass filter 33′ in tandem. The output of low-pass filter 33′ is applied to two-digit log pulse code modulation encoder 34′ which produces a two-digit binary output which is applied to two-digit register 35′.

Encoder 34′, as previously described and as well known in the art, produces a binary code which may be determined by the amplitude and frequency content of the analogue signal applied to it. A digital code will be produced, depending upon the region in which the measured analogue signal is found, as shown in FIG. 1.

If the analogue signal is in region 1, encoder 34′ will produce a binary 1 on each of its outputs. If the analogue signal falls in region 2, a binary 0 will appear on the upper output of encoder 34′ and a binary 1 will appear on its lower output. If the analogue signal falls in region 3, a binary 1 will appear on the upper output of encoder 34′ and a binary 0 will appear on its lower output; whereas, if the analogue signal is in region 4, a binary 0 appears on both outputs of encoder 34′.

Hysteresis circuit 3840 is connected to the output of two-digit register 35′. Hysteresis circuit 38′ comprises a plurality of AND gates of which only one may be activated at a given time in response to the previous digital code produced by encoder 34′ and now stored in 35′. The upper output of register 35′ is connected to AND gates 50, 51 and 52, while the lower output of register 35′ is connected to the second inputs of AND gates 50, 51 and 52. One input to each of AND gates 50 and 51 is inverted, as indicated by the small circles at the inputs of AND gates 50 and 51. The lower output of register 35′ is inverted at AND gate 50, while the upper output of register 35′ is inverted at AND gate 51. AND gates 50, 51 and 52 are used to control a biasing current, as previously described, flowing back to encoder 34′. The biasing current is used to lower the predetermined levels in encoder 34′ by applying an additional biasing current to the known electronic circuits included therein.

When a digital pulse is selected having magnitude 1′, a binary 1 appears at both outputs of encoder 34′ which is inverted in register 35′. Thus, a binary 0 occurs on both outputs of register 35′ and AND gates 50, 51 and 52 remain disabled. When a pulse having magnitude 2′ is selected, a binary 0 appears on the upper output of encoder 34′ and a binary 1 on its lower output. These are stored and inverted in register 35′ and cause AND gate 50 to be enabled, while maintaining AND gates 51 and 52 disabled. When AND gate 50 is enabled, current flows through resistor 53 and diode 54 to encoder 34′ which is used to adjust the predetermined levels in encoder 34′. Similarly, when a pulse having magnitude 3′ is selected, AND gate 51 is enabled while AND gates 50 and 52 remain disabled and a current flows through resistor 55 and diode 56 which serves to vary the predetermined levels in encoder 34′. AND gate 52 is enabled when a pulse having magnitude 4′ is selected, and current flows through resistor 57 and diode 58 to lower the predetermined levels in encoder 34′.

REsistors 53, 55 and 57 are not equal and, as shown in FIG. 3, resistor 53 is 16 times as large as resistor 57 and 4 times as large as resistor 55. The relationship between these resistors is determined by the logarithmically related step sizes produced in discrete step generators 26 and 42 of FIG. 2. When the previous pulse having magnitude 2′ was selected, the predetermined levels were lowered to a lesser extent than when the previous pulse selected had magnitude 4′. Consequently, resistors 53, 55 and 57 have the above-designated values.

FIG. 3 presents a circuit which may be used for delta modulation transmission employing the type of discrete companding described in my prior application. The hysteresis circuit minimizes undesirable pulse magnitude transitions in the step generators 26 and 42. By lowering predetermined levels B, C or D in accordance with the previously selected step, it is "easier" for the next selected step to be the same as the previous one. When the magnitude of the analogue signal varies significantly, a step size transition will occur; but, while the magnitude of the sampled analogue signal is relatively constant, undesirable step size transitions will be eliminated in accordance with the present invention.

The principles of the present invention may be utilized in any digital-to-analogue converter which produces a step size determined by the region in which the magnitude or some parameter of the analogue signal is found in accordance with that shown in FIG. 1. In addition, the principles of the present invention may be used with forward acting discrete companding disclosed in my prior application Ser. No. 674,943, filed Oct. 12, 1967. now U.S. Pat. No. 3,500,441. Further, the principles of the present invention may be used with backward acting companding disclosed in an application filed by S. J.

Brolin and J. M Brown on Apr. 3, 1968, having Ser. No. 718,550, and with a companding scheme utilizing the same step size in both directions disclosed in my prior application Ser. No. b 724,859, filed Apr. 29, 1968.

For purposes of illustration, the principles of the present invention have been shown as applied to a delta modulation system but it is to be understood that the above-described arrangement is illustrative of the application of the principles of the invention. Numerous other embodiments may be devised without departing from the spirit and scope of the invention.

I claim:

1. In a delta modulation transmission system with companding for transmission of a message signal including a delta modulator, said delta modulator comprising:

means to apply the message signal to one input of a two-input comparator;

means to produce a pulse having one polarity when the output of said comparator is positive and a pulse of the opposite polarity when the output of said comparator is negative;

means to integrate said pulse and apply it to the second input of said two-input comparator;

means to discretely vary the magnitude of said pulse, said last means comprising: a level sensor for sensing the level of said message signal;

means to provide a plurality of predetermined comparison levels;

means to produce a binary code responsive to the predetermined comparison level exceeded by said message signal;

means responsive to said binary code to control the magnitude of said pulse; and means responsive to said binary code to vary said exceeded predetermined comparison level.

2. Apparatus as set forth in claim 1 wherein said exceeded predetermined comparison level is lowered by a fixed amount.

3. Apparatus as set forth in claim 2 wherein said means to vary said exceeded predetermined comparison level comprises;

a plurality of AND gates each responsive to a different one of said binary codes;

a plurality of resistors, with one resistor of said plurality connected to a respective one of said plurality of AND gates; and means responsive to said produced binary code to supply a bias current to said level sensor through said resistor associated with said AND gate enabled by said produced binary code.

4. Apparatus as set forth in claim 3 wherein the resistance of each resistor in said plurality of resistors is different.